Feb. 1, 1938. M. P. DE MOTTE 2,106,971
ACETYLENE GENERATOR
Filed Aug. 2, 1934 2 Sheets-Sheet 1
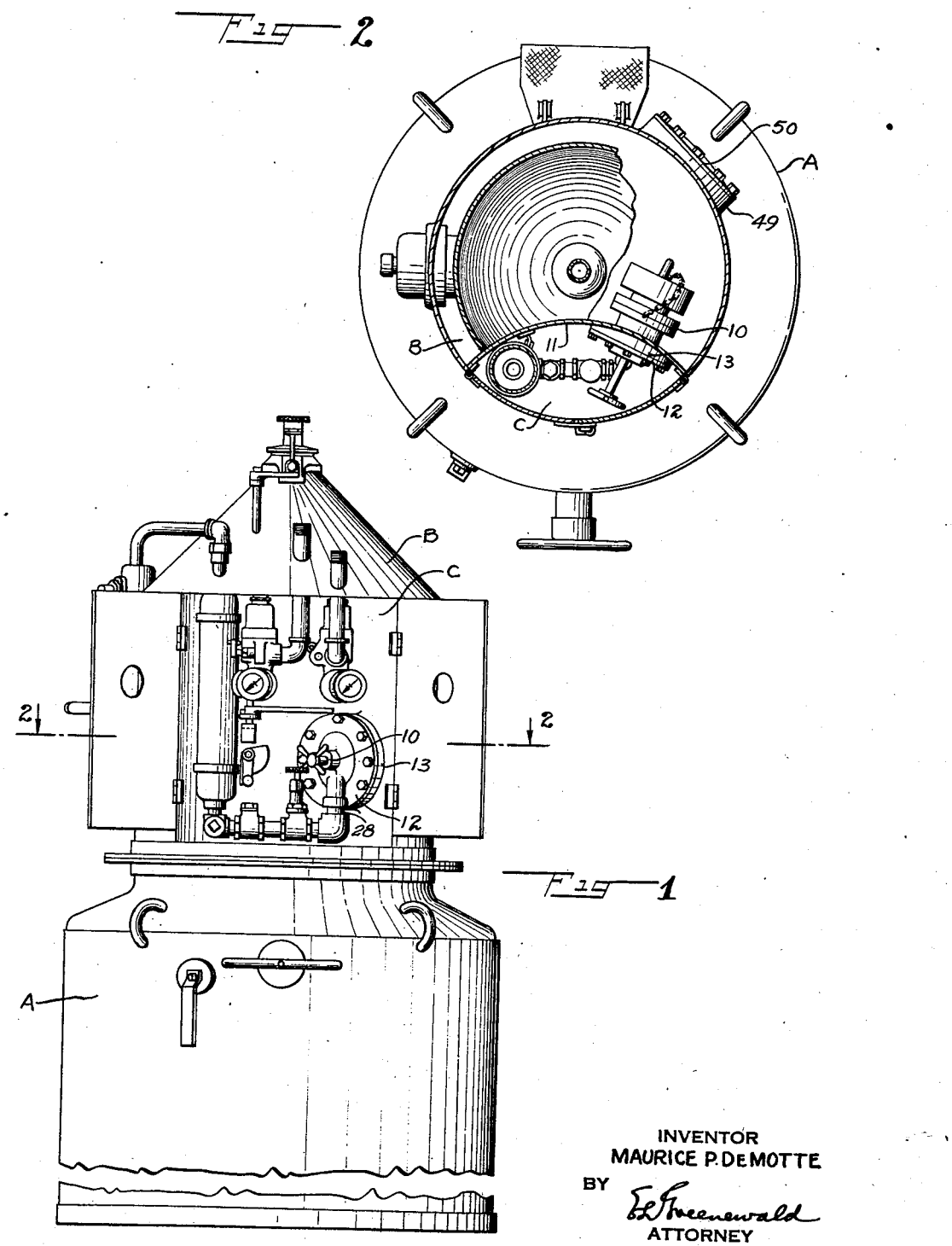
INVENTOR
MAURICE P. DE MOTTE
BY
ATTORNEY Feb. 1, 1938.　　　M. P. DE MOTTE　　　2,106,971
ACETYLENE GENERATOR
Filed Aug. 2, 1934　　　2 Sheets-Sheet 2
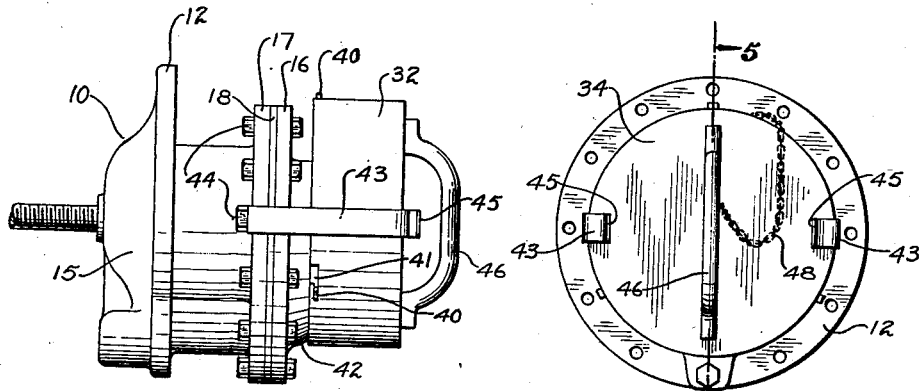
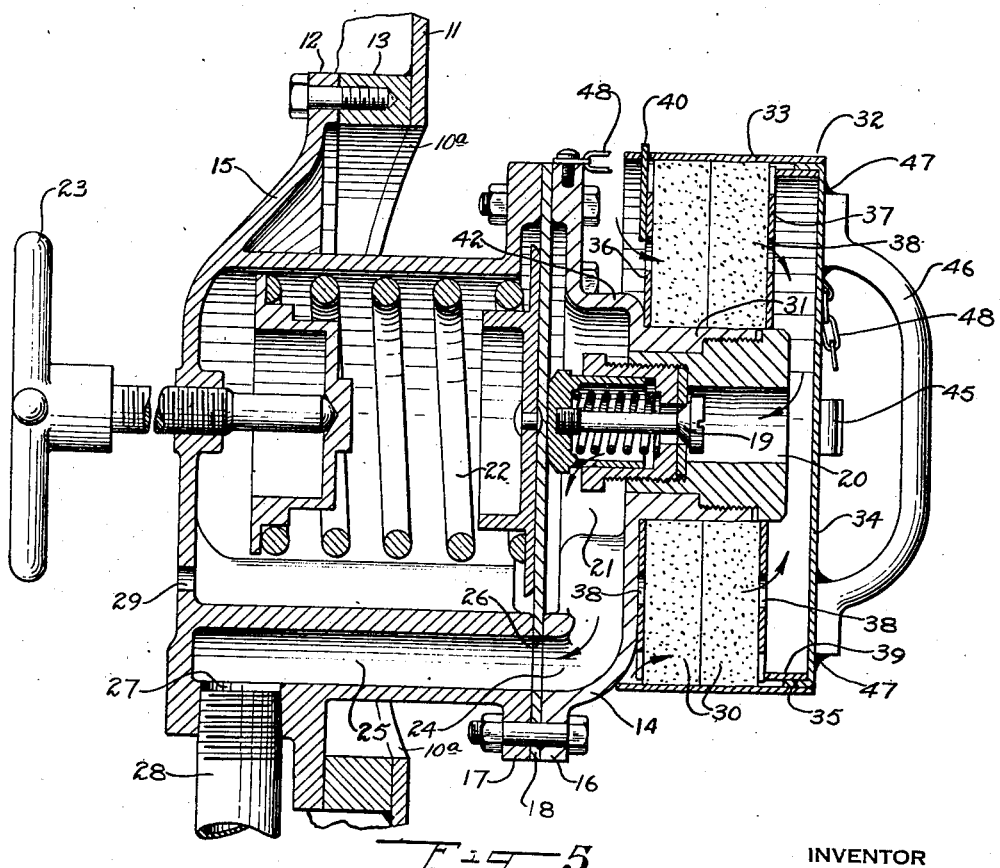
INVENTOR
MAURICE P. DE MOTTE
BY
ATTORNEY Patented Feb. 1, 1938

2,106,971

UNITED STATES PATENT OFFICE 2,106,971

ACETYLENE GENERATOR

Maurice P. De Motte, Indianapolis, Ind., assignor, by mesne assignments, to Union Carbide and Carbon Corporation, a corporation of New York Application August 2, 1934, Serial No. 738,099

13 Claims. (Cl. 48—56)

The invention relates to acetylene generators and more particularly to a pressure regulator and filter especially adapted for use with such generators, and also to the construction and relative size of such regulator and filter, and to the relative location of such regulator and filter with respect to the generator and the component features thereof that cooperate with the regulator and filter.

In acetylene generators provided with a pressure regulator it has been the custom heretofore to connect the regulator into a system of piping located outside of the generator. This construction usually requires considerable piping with numerous threaded joints that are subject to leakage, and requires the regulator to be positioned in a location where it is difficult to protect it from mechanical injury, especially in the case of portable generators. Therefore, one of the objects of this invention is to provide such a generator with a pressure regulator having the regulating mechanism located substantially within the generator where it is protected from injury and where the connecting piping between the generator and regulator inlet is entirely eliminated.

Regulators of this type are usually provided with a filter to prevent any dust within the generator from entering the regulator and interfering with its operation, but such filters are usually relatively small in size so that they require frequent cleaning, and they are usually located within the regulator where they are difficult to reach and remove. Therefore, another object of this invention is to provide such a regulator with a relatively large filter located outside of the regulator within the generator adjacent one of the openings in the generator casing where it may be readily removed and cleaned.

Other objects are to provide such a generator with a regulator having the gas inlet to the regulator within the generator casing and the gas outlet of the regulator outside of the generator casing, and to provide the inlet of such regulator with a filter that may be removed from the regulator and cleaned without the use of tools. These, and any other objects and novel features of the invention will be apparent from the following description and the accompanying illustration in which:

Fig. 1 is a front view of a generator illustrating one embodiment of my invention, with the doors of the accessory chamber open to show the location of the pressure regulator;

Fig. 2 is a horizontal sectional view of the generator along line 2—2 of Fig. 1 with part of the hopper broken away to show the relative location of the regulator, filter, and the handhole or cleanout door;

Fig. 3 is a side view of the isolated regulator and filter of Figs. 1 and 2 showing the means for securing the filter to the regulator;

Fig. 4 is a view of the inside end of the isolated regulator and filter showing the shape of the filter and also the means for securing the filter to the regulator; and, Fig. 5 is a sectional view of the regulator and filter taken along the line 5—5 of Fig. 4 showing the construction and relative arrangement of the component parts.

The embodiment of the invention shown by the drawings may consist of an acetylene generator comprising a lower water containing section A and an upper gas and carbide hopper containing section B having a recess or chamber C in one side thereof for the auxiliary or gas control accessory equipment with which such generators are usually provided. This accessory equipment includes a pressure regulator 10 which may be located in any suitable protected position such as within an opening in the outer wall or casing of the generator, and preferably within an opening 10a in the partition 11 between the gas chamber B and the recess C. Although the regulator 10 may be mounted in any suitable manner it is preferably provided with a surrounding annular flange 12 that may be secured directly to the partition 11 but, due to the curvature of the partition, may be more conveniently secured to a flange ring 13 surrounding the opening 10a therein for the regulator and secured thereto by suitable means such as an autogenous weld. The supporting flange 12 may be located at any suitable position between the inlet and the outlet of the regulator but it is preferably located near the front or outer end so that the larger portion of the regulator is within the generator where it is protected from mechanical injury.

The regulator may comprise a body 14 and a cap 15 provided with respective cooperating flanges 16 and 17 conventionally secured to a diaphragm 18 which operates a valve 19 that controls the flow of gas from an inlet 20 to a chamber 21. Variations in gas pressure within the chamber move the diaphragm against the pressure of a control spring 22, which is adjustable from the outside of the regulator by manual movement of an adjustable operating handle 23. To conduct the gas from the low or reduced pressure chamber 21 to the outside of the generator the regulator may be provided with a gas outlet passage or conduit 24 in body 14 in cooperative relation with a gas passage or conduit 25 in cap 15 through a corresponding opening or aperture 26 in diaphragm 18. Passage 25 may be provided with a suitable outlet outside the generator such as outlet 27 which may be suitably threaded to receive a correspondingly threaded exterior conduit or pipe 28 which may be connected with other accessory equipment with which the generator is provided. By thus providing a generator with a pressure regulator mounted in an opening in the outer wall, the inlet 20 of the regulator is within the generator and all piping between the generator and the inlet is obviated. Also, as the outlet 27 of the regulator is outside the generator the amount of piping between the outlet and other portions of the generator equipment may be materially reduced, and as the operating handle 23 and the breather hole 29 are both outside of the generator no stuffing box or other connection is necessary.

In order to remove dust and other foreign matter from the gas entering the regulator the inlet may be provided with a suitable filter, and to obviate the necessity for frequent cleaning, the filter may be of relatively large size. The filter may consist of any suitable filter material such as one or more rings or discs of porous filter felt 30 each having an opening therein, preferably at the center or axis thereof, to provide an inner angular edge or margin that fits tightly over a projection or protruding portion of the regulator such as a cylindrical housing or boss 31 surrounding the gas inlet 20. To connect the filter and inlet in succession and direct the gas entering the inlet 20 through the filter, both the inlet 20 and the filter discs 30 may be inclosed in a container such as an impervious filter casing 32 having a side wall of suitable shape, such as an imperforate cylindrical side wall 33, fitting the outer annular edges, periphery, or margin of the filter sheets 30, and a suitable end preferably spaced from the filter sheets 30, such as a flat imperforate plate 34, which may have an outer margin provided with an inturned flange 35 secured to the side wall 33 by suitable means such as an autogenous weld.

The relative location of the filter sheets 30 and the container 32 may be maintained, and the sides of the filter sheets may be supported by suitable retaining plates 36 and 37, each secured within casing 32 in close contact with one outer side or surface of the filter sheets 30. The retaining plates 36 and 37 may be provided with suitable openings 38 for free passage of the gas through the filter, and they are preferably of substantially the same size and shape as the filter sheets so that they fit closely on the boss 31 and also within the casing 32. A suitable space for the free passage of gas from the inner surface of the filter to the inlet of the regulator may be provided by spacing the filter and retaining plate 37 a suitable distance from the end plate 34 of the filter container 32, and this spaced relation may be maintained by suitable spacing means such as a spacing ring 39 extending around the inner face of flange 35 between end plate 34 and retaining plate 37. The filter sheets 30 may be removably retained in casing 32 by providing retaining plate 36 with suitable latching or detaining means such as two or more outwardly extending catches 40 that fit in a like number of respective cooperating bayonet type openings 41 in the inner edge of the side wall 33 of casing 32. A free gas passage from the inside of the filter casing to inlet 20 may be provided by spacing the end plate 34 of the filter casing 32 a suitable distance from the outer end of boss 31 in which inlet 20 is located, and free passage of gas into the filter may be obtained by spacing the filter and retaining plate 36 a suitable distance from the body 14 of the regulator, and this relative spacing may be maintained by providing boss 31 with a suitable shoulder such as 42 or other means for locating the filter with respect to the body of the regulator.

The filter may be of any suitable size and it may be secured to the regulator in any suitable manner but to avoid frequent cleaning it is preferably comparatively large so that its outer diameter is substantially the same as the diameter of the flanges 16 and 17 of the regulator body, and to facilitate removal of the filter from the regulator for inspection and cleaning it may be secured to the regulator so that it may be readily removed without the use of tools or the removal of securing means such as bolts or screws that might accidentally fall into the generator and cause trouble or delay. For example, the filter may be secured to the regulator by one or more resilient latches or spring clips 43 that are rigidly secured to the regulator and snap or latch over the outer face of the filter casing. The spring clips preferably lie close to the side of the regulator and filter and each may be provided with an overturned end having an opening therein of suitable size to receive one of the diaphragm securing bolts 44 by which it is rigidly secured to the regulator, and also with a suitably formed inturned end 45 that overlies the outer margin of the end plate 34 of the filter casing 32 and normally holds the filter in operative relation with the regulator, but may be manually moved out of engagement with the filter when it is desirable to remove the filter from the regulator.

To facilitate removal and cleaning, the filter may be provided with suitable manipulatory means such as a hand grip or handle 46 which may be secured to the end plate 34 of filter casing 32 by any conventional fastening such as one or more autogenous welds 47, and to obviate the possibility of dropping the filter into the water in the bottom of the generator when it is removed for cleaning, it may be provided with safety means such as a safety chain 48 having one end secured to the regulator and the other secured to the filter by any suitable conventional fastening. The gas within the generator when entering the regulator passes between the regulator and the filter, through the openings in retaining plate 36, through the porous sheets of filter material 30, and through the openings in the inner retaining plate 37 into the chamber or space in the closed end of the filter where it is free to pass into the inlet 20 of the regulator when valve 19 is open.

The filter and most of the regulator is within the gas chamber of the generator and access to the filter without removing or detaching the regulator may be facilitated by providing the generator with a handhole or cleanout opening 49 located adjacent the filter and the inner end of the regulator. This opening may be of conventional type provided with a manually removable closure or cover 50 which may be removed to enable an operator to readily reach the filter.

The structure, arrangement, and operation of the various features of the generator and regulator, not specifically described in this application for sake of brevity, may be of a conventional nature as the features described may be employed with generators and regulators of various kinds. A generator provided with a chamber or recess, such as that shown at C in this application, is shown, claimed, and more particularly described in a copending application of Maurice P. De Motte and Clarence H. Baker, Serial No. 739,731, filed August 14, 1934.

The exact shape, form, and relative arrangement of the component parts shown and described are not imperative but are given as an example of a preferred embodiment of the invention, and it is understood that they may be changed or altered and that other similar or equivalent component parts and materials may be substituted without departing from the spirit of the invention or the scope of the claims.

I claim:

1. An acetylene generator comprising a casing enclosing a gas generating chamber, said casing including a wall having a hole therethrough opening into said chamber; a gas delivery conduit extending through said hole into said chamber, adapted to communicate with said chamber and to convey acetylene gas therefrom to a gas distributing device; and mechanism responsive to pressure within said delivery conduit for controlling the flow of gas from said chamber into said conduit, said conduit passing through said pressure-responsive mechanism, said mechanism being enclosed within a housing, the major portion of which is disposed within said chamber, said mechanism, housing and conduit being removably mounted on said wall and removable as a unit from said chamber through said hole.

2. An acetylene generator as claimed in claim 1, in which the vertical wall of the casing has another hole therethrough which is so disposed relatively to the first-mentioned hole that the inner end of said housing is accessible by reaching through said other hole, and removable means for normally closing such other hole.

3. An acetylene generator comprising a casing enclosing a gas generating chamber, said casing including a wall having an opening therethrough; a gas delivery conduit adapted to communicate with said generating chamber; mechanism, operating responsively to the gas pressure within said delivery conduit, for controlling the flow of gas from said generating chamber into said delivery conduit, said conduit passing through said pressure-responsive mechanism, said mechanism comprising a supporting body including a housing therefor removably mounted in said opening and extending into said generating chamber whereby the major portion of said mechanism is positioned within said chamber; and gas filtering means constructed and arranged to filter gas flowing from said chamber into said conduit, said filtering means being supported only by said body and removable with the latter from said chamber.

4. An acetylene generator comprising a casing enclosing a gas generating chamber, said casing including a wall having an opening therethrough; a gas delivery conduit adapted to communicate with said generating chamber; mechanism operating responsively to the gas pressure within said delivery conduit, for controlling the flow of gas from said generating chamber into said delivery conduit, said mechanism including a supporting body therefor removably mounted in said opening and extending into said generating chamber; and gas filtering means constructed and arranged to filter gas flowing from said chamber into said conduit, said filtering means being supported only by said body and removable with the latter from said chamber and comprising a filtering medium and a container therefor, said container being frictionally connected to and quickly removable from said supporting body.

5. An acetylene generator comprising a casing enclosing a gas chamber, said casing including a vertical wall having a hole therethrough opening into said chamber; a housing removably secured to said wall and extending through said opening into said chamber, said housing having a passage therethrough extending to the outside of said generator and constituting a gas delivery conduit adapted to communicate with said chamber; and mechanism for controlling the flow of gas from said chamber into said passage, such mechanism comprising a diaphragm within said chamber, carried by said housing, and through which said passage extends, and a valve within said chamber and associated with said diaphragm.

6. An acetylene generator as claimed in claim 5, including a filtering device removably mounted on said housing and adapted to filter gas flowing from said chamber into said passage and before such gas reaches said valve, said device and mechanism being removable from said generator as a unit upon removing said housing from said hole.

7. An acetylene generator as claimed in claim 5, including a gas filtering device removably mounted on said housing within said chamber, the vertical wall of said casing having another hole therethrough which is of such size and so disposed relatively to the first-mentioned hole that said device is accessible and removable from said chamber through such other hole, and removable means for normally closing such other hole.

8. An acetylene generator comprising a casing enclosing a gas generating chamber, a portion of a vertical side of said casing extending inwardly to provide an exterior recess accessible from the outside of the generator, such inwardly-extending wall portion having an opening therethrough into said chamber; a gas delivery conduit adapted to communicate with said generating chamber; and mechanism, mounted in said opening and operating responsively to the gas pressure within said delivery conduit, for controlling the flow of gas from said generating chamber into said delivery conduit, said mechanism including a manually operable device within said exterior recess for so adjusting said mechanism that gas at a predetermined pressure will flow from said generating chamber into said delivery conduit.

9. An acetylene generator as claimed in claim 8, including door means for closing said recess, said door means being coextensive with the parts of said vertical side adjoining said recess.

10. An acetylene generator as claimed in claim 8, in which said mechanism comprises a supporting body extending into said generating chamber and having a passage extending therethrough from said chamber to said recess and constituting a portion of said gas delivery conduit; and a filter mounted solely on said body within said chamber ahead of the inlet of said passage, to filter gas flowing from said chamber into said passage.

11. A fluid pressure regulator for acetylene generators comprising a fluid inlet; a spring chamber; a fluid delivery conduit having a wall in common with one wall of said chamber; a flexible diaphragm constituting another wall of said chamber and through which said conduit passes, said diaphragm being movable responsively to fluid pressure variations in said conduit; a spring in said chamber bearing against said diaphragm; and a valve operable by said diaphragm to control the flow of fluid from said inlet to said conduit.

12. A fluid pressure regulator as claimed in claim 11, in which the axes of said spring and valve and inlet are in alignment, and the axis of said conduit is spaced from and substantially parallel to such aligned axes.

13. A fluid pressure regulator as claimed in claim 11, including a chamber for said valve, and an annular fluid filtering device removably mounted on the outer wall of such valve chamber.

MAURICE P. DE MOTTE.